US011741009B1

(12) United States Patent
Gupta et al.

(10) Patent No.: US 11,741,009 B1
(45) Date of Patent: Aug. 29, 2023

(54) REQUEST ORDERING IN A CACHE

(71) Applicant: Apple Inc., Cupertino, CA (US)

(72) Inventors: Sandeep Gupta, Cupertino, CA (US); Brian P Lilly, San Francisco, CA (US); Krishna C Potnuru, San Jose, CA (US)

(73) Assignee: Apple Inc., Cupertino, CA (US)

( * ) Notice: Subject to any disclaimer, the term of this patent is extended or adjusted under 35 U.S.C. 154(b) by 18 days.

(21) Appl. No.: 17/526,944

(22) Filed: Nov. 15, 2021

Related U.S. Application Data

(60) Provisional application No. 63/239,261, filed on Aug. 31, 2021.

(51) Int. Cl.
*G06F 12/00* (2006.01)
*G06F 12/0802* (2016.01)

(52) U.S. Cl.
CPC ...... *G06F 12/0802* (2013.01); *G06F 2212/60* (2013.01)

(58) Field of Classification Search
CPC ............. G06F 12/0802; G06F 12/0806; G06F 2212/60; G06F 9/3836; G06F 9/3855; G06F 13/14; G06F 13/1621; G06F 13/1642; G06F 13/1652
See application file for complete search history.

(56) References Cited

U.S. PATENT DOCUMENTS

| | | | |
|---|---|---|---|
| 7,366,847 B2 | 4/2008 | Kruckemyer et al. | |
| 7,917,699 B2 | 3/2011 | Kim et al. | |
| 8,117,392 B2 | 2/2012 | Charney et al. | |
| 2004/0107324 A1* | 6/2004 | Nystuen | G06F 13/1626 711/158 |

* cited by examiner

*Primary Examiner* — Shawn X Gu

(74) *Attorney, Agent, or Firm* — Robert C. Kowert; Kowert, Hood, Munyon, Rankin & Goetzel, P.C.

(57) ABSTRACT

A cache may include multiple request handling pipes, each of which may further include multiple request buffers, for storing device requests from one or more processors to one or more devices. Some of the device requests may require to be sent to the devices according to an order. For a given one of such device requests, the cache may select a request handling pipe, based on an address indicated by the device request, and select a request buffer, based on the available entries of the request buffers of the selected request handling pipe, to store the device request. The cache may further use a first-level and a second-level token stores to track and maintain the device requests in order when transmitting the device requests to the devices.

20 Claims, 10 Drawing Sheets

Computer Accessible Storage Medium 800

REQUEST ORDERING IN A CACHE

This application claims benefit of priority to U.S. Provisional Application Ser. No. 63/239,261, entitled "Request Ordering in a Cache," filed Aug. 31, 2021, and which is hereby incorporated herein by reference in its entirety.

BACKGROUND

Technical Field

Embodiments described herein are related to a cache and, more particularly, to a last-level cache that is able to track and send device requests according to an order.

Description of the Related Art

Computing systems generally include one or more processors that serve as central processing units (CPUs). The CPUs execute the control software (e.g., an operating system) that controls operation of the various peripherals. The CPUs can also execute applications, which provide user functionality in the system. Sometimes, a processor may use a cache, e.g., a last-level cache (LLC), to function as a "buffer" for transmitting device requests. For example, device requests from a processor may be first temporarily stored at the cache, and then sent from the cache to corresponding devices. Sometimes, the device requests may require to be sent to the devices according to an order, e.g., the temporal order in which the device requests are issued from the processor and received at the cache. However, when the device requests are stored at the cache, they may not necessarily be stored strictly according to the order. In other words, the ordering information could be lost within the cache. Thus, it is desirable for a cache designed to be able to track and maintain the order for transmitting the device requests.

BRIEF DESCRIPTION OF THE DRAWINGS

The following detailed description refers to the accompanying drawings, which are now briefly described.

Figure 1:
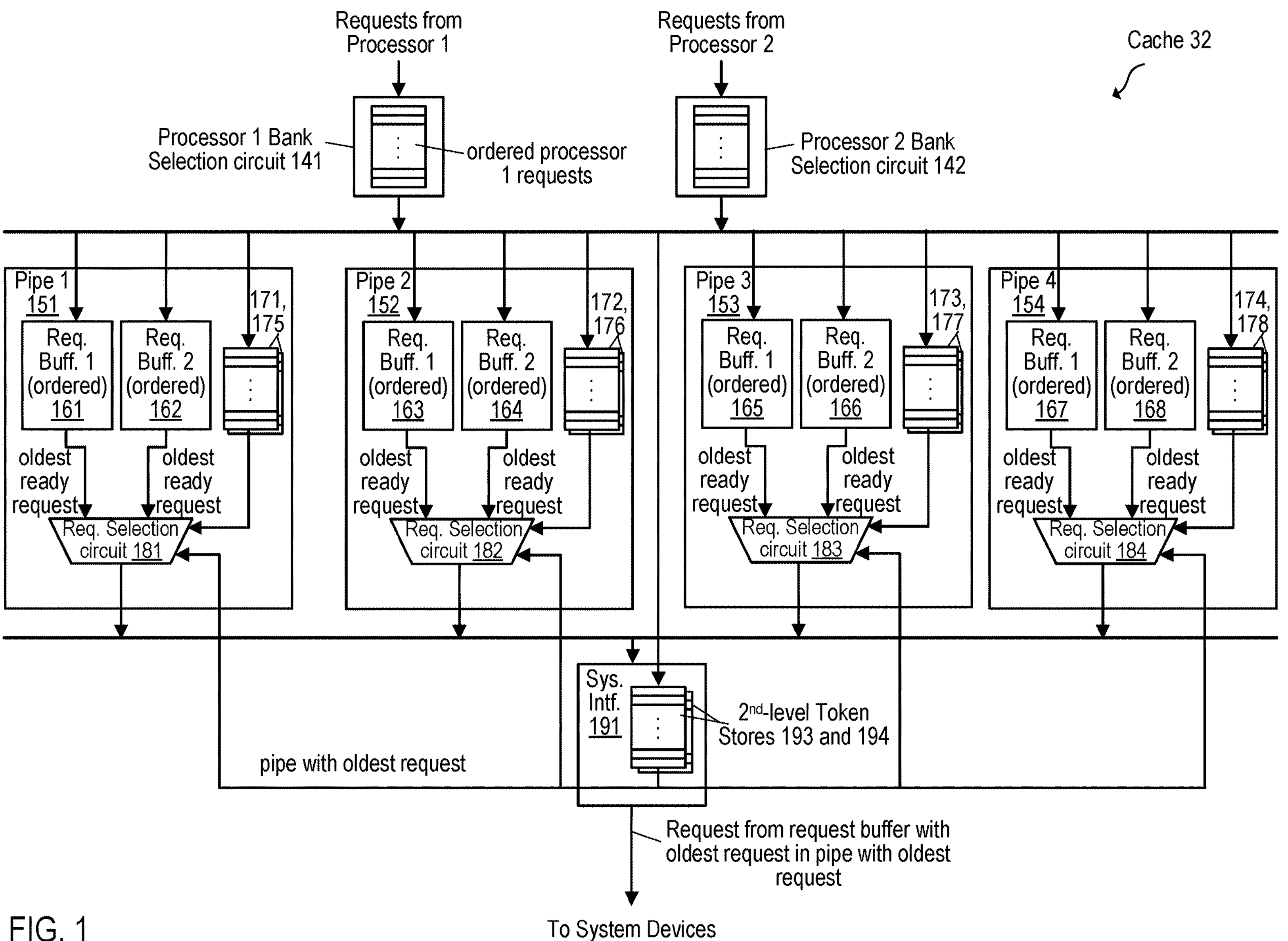
FIG. 1 is a block diagram of one embodiment of a cache.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

Turning now to FIG. 1, a block diagram of one embodiment of a portion of a processor 30 including a cache 32 is shown. As indicated in FIG. 1, in the illustrated embodiment, the cache 32 may include one or more request handling pipes 151, 152, 153, and 154. In addition, each request handling pipe may further include one or more request buffers. For example, in FIG. 1, request handling pipe 151 may include request buffers 161 and 162. Similarly, request handling pipes 152, 153, and 154 may respectively include request buffers 163 and 164, 165 and 166, and 167 and 168. In this disclosure, a request handling pipe may also be referred to as a "pipe," and a request buffer also as a "request bank" or "PRB." Sometimes, the cache 32 may be a last-level cache that is shared by multiple processors of a system, e.g., processor 1 and processor 2 of a system on chip (SOC) 10. The cache 32 may use the request buffers 161-168 within the request handling pipes 151-154 to temporarily store requests that are issued by the processors to various devices. Note that the term "device request" may broadly refer to a request directed to a memory region that may require a stricter ordering than transactions to normal memory regions. For example, a device request may be directed to an address-accessible peripheral device of a system on chip (SOC) 10, a memory region of the SOC 10, etc. that may have an ordering requirement for access requests.

Referring to FIG. 1, in the illustrated embodiment, the cache 32 may include two bank selection circuits 141 and 142, each of which may be used as an interface between the cache 32 and a corresponding processor. For example, bank selection circuit 141 may be used to handle device requests from processor 1, and bank selection circuit 142 may be used to handle device requests from processor 2. Further, bank selection circuit 141 and 142 may individually include a buffer to temporarily store device requests received from the processors, before the device requests are sent from the bank selection circuit to the request buffers for storage. In the illustrated embodiment, the buffers of bank selection circuits 141 and 142 may be each implemented as a first-in first-out (FIFO) buffer. In the FIFO buffer, a first device request received at a bank selection circuit at one time may be stored at a position ahead of a second device request received at a later time, and further the first device request at the higher position may also be sent out of the bank selection circuit to the request buffers prior to the second device request at the lower position. In other words, the device requests may be received, stored, and sent out of a bank selection circuit in order. This way, the transmission of device requests between a processor and the request handling pipes 151-154, via a corresponding bank selection circuit, may be maintained in order as indicated in FIG. 1.

When a bank selection circuit receives a device request from a processor, it may select first a request handling pipe and then a request buffer to store the device request. In the illustrated embodiment, the bank selection circuit may select the request handling pipe based on an address indicated by the device request. For example, besides request buffers, request handling pipe 151-154 may each also include its own memory (not shown) that stores one or more memory maps. The memory maps may indicate a mapping between various memory regions (including a memory region for the device) and mapped addresses. Thus, when the address directed to by a device request corresponds to an address in a memory map within a request handling pipe, this request handling pipe may be selected by the bank selection circuit to store the device request. For example, assuming that request handling pipe 151 includes a memory map indicating that a device (e.g., a memory region) is mapped to a processor-accessible address OxA236, and bank selection circuit 141 receives a device request from processor 1 that is directed to the address OxA236, bank selection circuit 141 may select the request handling pipe 151 out of the four request handling pipes 151-154 of the cache 32 for storing this device request. Note that in some embodiments, the memory within the cache 32 may be addressable to processors. Thus, the cache 32 may receive a request from a processor for accessing the data (e.g., a write or a read request) stored at an address within the cache 32, and accordingly the cache 32 may access the data at the indicated address within the cache 32.

However, the selected request handling pipe may include multiple request buffers. Thus, the bank selection circuit may further select a request buffer out of the multiple request buffers of the selected request handling pipe to store the device request. In the illustrated embodiments, each request handling pipe 151-154 includes two request buffers. Thus, the bank selection circuit may select the request buffer based on occupancy or available entries inside the two request buffers of the previously-selected request handling pipe. In the foregoing example, after the bank selection circuit 141 selects the pipe handling pipe 151, the bank selection circuit 141 may further obtain information of the occupancy of available entries inside the two request buffers 161 and 162 of the pipe handling pipe 151. If the request buffer 161 is less occupied or has more empty entries than the request buffer 162, the bank selection circuit 141 may select the request buffer 161 for storing the device request. In other words, a bank selection circuit may implement a two-level or two-step selection operation for storing a device request, e.g., (a) select a request handling pipe at the pipe-level, and (b) select a request buffer within the selected request handling pipe at the PRB-level.

The device requests from a processor may have various ordering attributes, which may affect the way how the device requests are to be transmitted from the cache 32 to the devices. Sometimes, device requests to different devices may require to be transmitted according to a strict order, such as the temporal order in which they are originally issued from the processor and received at the cache 32. For example, a processor may issue a first device request (e.g., to write a value) to a first device, and next a second device request (e.g., to read a value) to a second device. However, the value at the second device may depend on the value at the first device. Or, in other words, a change of the value at the first device may also change the value at the second device. Thus, even though the two device requests are issued to two devices, they may still require to be sent to the two devices according to their original temporal order in which they are issued by the processor. In the illustrated embodiment, these device requests may be assigned as a non-reorderable attribute, or may be referred to as non-reorderable device requests. In some embodiments, an ordering attribute may be assigned to a device request by a processor (e.g., when the device request is issued at the processor) and transmitted along with the device request to the cache 32. In other words, when the cache 32 receives a device request (e.g., at the bank selection circuits 141 and 142), the cache 32 may be able to identify the ordering attribute of the device request and accordingly determine whether or not it may need to transmit the device request according to an order.

Sometimes, device requests to different devices may not necessarily be required to be transmitted according to a strict order. In the above example, if the value at the second device does not necessarily depend on the value at the first device, then it may not necessarily matter what order the two device requests are sent to the two devices. In other words, the transmission of the two device requests may be reordered. In the illustrated embodiment, such device requests may be assigned as a limited-reorderable attribute, or may be referred to as limited-reorderable device requests.

Note that sometimes device requests issued from a same processor to a same device (e.g., to a same address) may still need to remain in order, regardless of the ordering attributes that may be assigned to the device requests. This may be easily understood, since an out of order transmission of device requests to a same device may often cause data integrity issues.

As described above, the transmission of device requests between a processor and the request handling pipes 151-154, through a corresponding bank selection circuit, may be maintained in order by the corresponding bank selection circuit. However, when the device requests get stored at the request buffers 161-168 of the cache 32, they may not necessarily be stored strictly according to the order. For example, a request handling pipe for storing a device request may be selected (at the pipe-level) based on an address indicated by the device request, and a request buffer for storing the device request may be selected (at the PRB-level) based on the occupancy or available entries of the request buffers of the request handling pipe. Neither of the criteria may obviously indicate a temporal order.

Thus, to meet the ordering requirement of the device requests, e.g., for the non-reorderable device requests and device requests directed to a same device, the cache 32 may use a token system for each processor to track and maintain the transmission of the device requests in order. For example, in FIG. 1, the cache 32 may include a second-level token store 193 and first-level token stores 171, 172, 173, and 174 for device requests from processor 1, and a second-level token store 194 and first-level token stores 175, 176, 177, and 178 for device requests from processor 2. In the illustrated embodiments, first-level token stores 171 and 175, 172 and 176, 173 and 177, and 174 and 178 may be implemented respectively as part of the corresponding request handling pipe 151, 152, 153, and 154.

Consider the token system for processor 1 as an example. The cache 32 may use the second-level token store 193 to track the order in which non-reorderable device requests from the processor 1 are stored across the request handling pipes 151-154 of the cache 32, and the first-level token stores 171-174 respectively to track the order in which a subset of the non-reorderable device requests are stored at a corresponding request handling pipe 151-154. For example, when a non-reorderable device request from the processor 1 is received at the cache 32, as described above, the bank selection circuit 141 may select a request handling pipe out of the request handling pipes 151-154 to store the device request. Accordingly, once the request handling pipe is selected, the bank selection circuit 141 may store a value at the second-level token store 193 to indicate the selected request handling pipe. For example, in the illustrated embodiments, given that cache 32 has four request handling pipes 151-154, the bank selection circuit 141 may use a value 1 to indicate the request handling pipe 151, a value 2 to indicate the request handling pipe 152, a value 3 to indicate the request handling pipe 153, and a value 4 to indicate the request handling pipe 154. In the foregoing example where the bank selection circuit 141 selects the request handling pipe 151 to store a device request received (assuming that the device request is a non-reorderable request), the bank selection circuit 141 may store a value 1 at the second-level token store 193 to indicate that this device request is stored within the request handling pipe 151. Similarly, for a next non-reorderable request from processor 1, if the bank selection circuit 141 selects the request handling pipe 173 to store this next device request, the bank selection circuit 141 may store a value 3 at the second-level token store 193 to indicate that this next device request is stored within the request handling pipe 173. As described above, since the device requests are received, stored, and sent out of the bank selection circuit 141 in order, the values in the second-level token store 193 may thus track the order in which the (non-reorderable) device requests are stored across the different request handling pipes 151-154 of the cache 32. In the illustrated embodiment, the second-level token store 193 may be implemented using a first-in first-out (FIFO) register. In other words, an entry at the top of the FIFO register may correspond to an oldest device request that is first received and stored at the request handling pipes of the cache 32, and may also be the first entry to be popped out of the FIFO register.

Within a given request handling pipe, the order in which a subset of the non-reorderable device requests is stored across the multiple request buffers of the request handling pipe may be tracked by the cache 32 using the corresponding first-level token store of this request handling pipe. Consider the request handling pipe 151 as an example. Assuming that a subset of non-reorderable device requests from processor 1 is stored within the request handling pipe 151, individual ones of the subset of non-reorderable device requests may be stored at the request buffers 161 and 162 of the request handling pipe 151 based on the occupancy or available entries of the request buffers 161 and 162. For each one of these device requests, once the bank selection circuit 141 selects a request buffer of the request handling pipe 151 to store the device request, the bank selection circuit 141 may store a value at the first-level token store 171 to indicate the selected request buffer in which the device request is stored. In the illustrated embodiment, since the request handling pipe 151 includes two request buffers 161 and 162, the bank selection circuit 141 may use a value 1 to indicate the request buffer 161, and a value 2 to indicate the request buffer 162. Again, following the example described above where the bank selection circuit 141 selects the request buffer 161 to store a device request (assuming that the device request is a non-reorderable request), the bank selection circuit 141 may store a value 1 at the first-level token store 171 to indicate that this device request is stored at the request buffer 161. Similarly, for a next non-reorderable request from processor 1 that is stored within the request handling pipe 151, if the bank selection circuit 141 selects the request buffer 162 to store this next device request, the bank selection circuit 141 may then store a value 2 at the first-level token store 171 to indicate that this next device request is now stored at the request buffer 162. Thus, even though the subset of the non-reorderable device requests is stored at the request buffers 161-162 based on their occupancy or available entries, the values in the first-level token store 171 may still indicate the order in which this subset of device requests is stored across the two request buffers. In the illustrated embodiments, the second-level token store 171 may be implemented using a FIFO register.

Similarly, the cache 32 may use the second-level token store 194 to track the order in which non-reorderable device requests from another processor, e.g., the processor 2, is stored across the different request handling pipes 151-154, and use the first-level token stores 172-178 to track the order in which non-reorderable device requests from respective processors are stored within each request handling pipes 151-154. In the illustrated embodiments, these token stores may also be individually implemented as a FIFO register.

Figure 2:
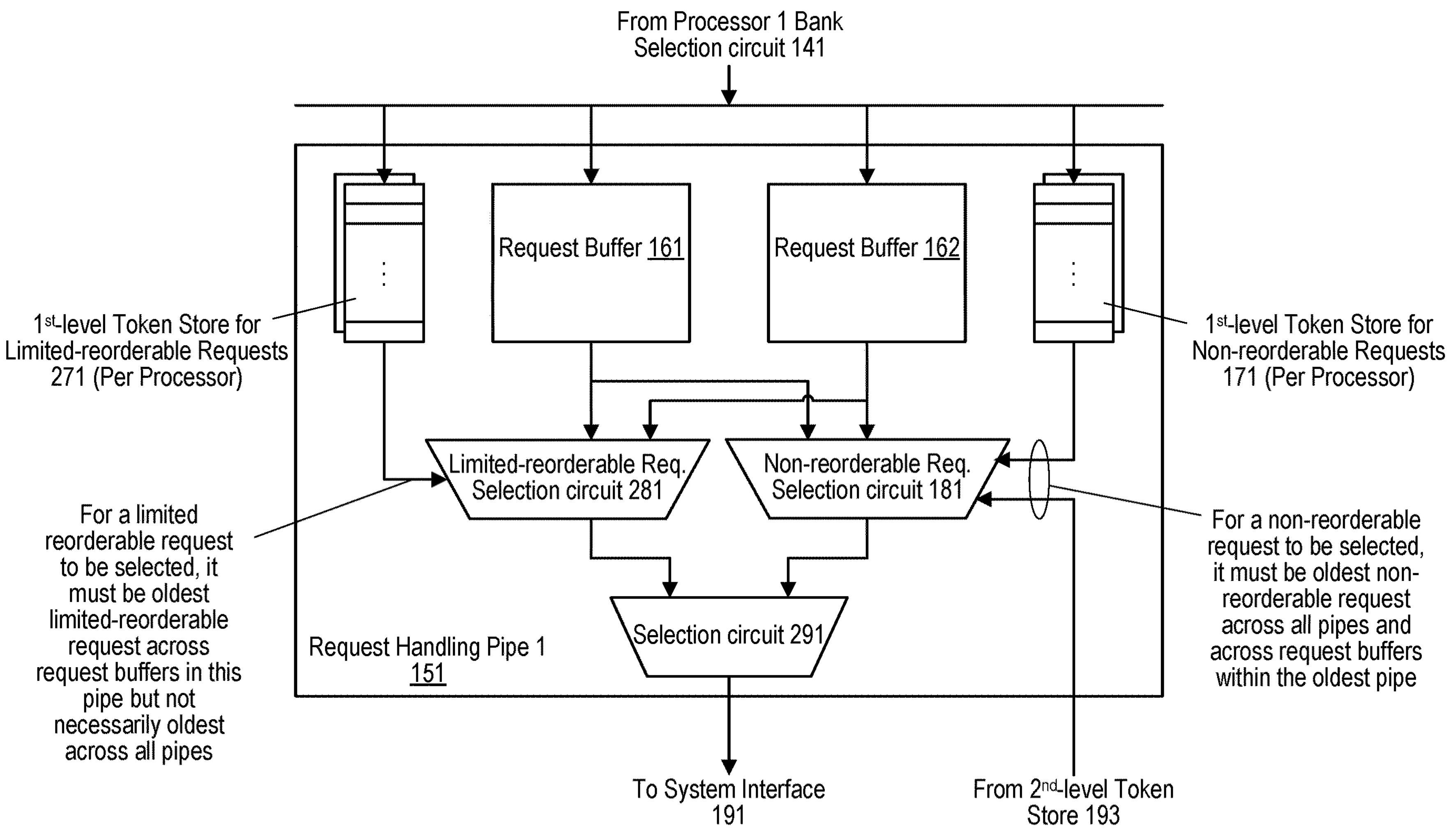
FIG. 2 is a block diagram of one embodiment of a request handling pipe of a cache.

Turning to FIG. 2, a block diagram illustrating one embodiment of a request handling pipe of a cache is shown. For purposes of illustration, FIG. 2 only shows relevant components related to the transmission of device requests of the processor 1. Operations of the cache 32 for the transmission of device requests of another processor (e.g., the processor 2) would be substantially similar (e.g., using the corresponding token system for the processor 2). As indicated in FIG. 2, the request handling pipe 151 may include two request buffers 161 and 162. As described above, request buffers 161 and 162 may respectively store device requests from the processor 1, some of which may be non-reorderable device requests and some of which may be limited-reorderable device requests. Further, the request handling pipe 151 may include a non-reorderable request selection circuit 181 to select a device request from the stored non-reorderable device requests to be sent to a corresponding device, and a limited-reorderable request selection circuit 281 to select a device request from the stored limited-reorderable device requests to be sent to a corresponding device.

As described above, each of the non-reorderable device request stored across the request handling pipes 151-154 of the cache 32 may correspond to a value stored at the second-level token store 193 of the cache 32. Further, each of the non-reorderable device request stored within the request handling pipe 151 may correspond to a value stored at the first-level token store 171 of the request handling pipe 151. The values in the second-level token store 193 may indicate the order in which the non-reorderable device requests are stored across the request handling pipes 151-154 of the cache 32, while the values in the first-level token store 171 may indicate the order in which a subset of the non-reorderable device requests are stored across the request buffers 161 and 162 of the request handling pipe 151. Thus, using the values at the second-level token store 193, the non-reorderable request selection circuit 181 may be able to identify at which one of the request handling pipes 151-154 of the cache 32 an oldest non-reorderable device request out of the non-reorderable device requests from processor 1 currently stored at the cache 32 is located. For example, if it is stored at the request handling pipe 151, the non-reorderable request selection circuit 181 may further use the values at the first-level token store 171 of the request handling pipe 151 to identify the oldest non-reorderable device request and at which one of the two request buffers 161-162 this oldest non-reorderable device request is stored.

For example, in the illustrated embodiment, the non-reorderable request selection circuit 181 may be implemented as a multiplexer that may be coupled with multiple inputs (e.g., the two request buffers 161-162) and provide one output during each operational cycle (e.g., each clock cycle). Since the second-level token store 193 may be implemented as a FIFO register, in one cycle, the entry at the top of the second-level token store 193 may be popped out of the second-level token store 193 to indicate the oldest non-reorderable device request (out of the non-reorderable device request currently stored across the request handling pipes 151-154 of the cache 32) to be transmitted. For example, the value at this entry may be 1 and thus indicate that this oldest non-reorderable device request is stored at the request handling pipe 151. The second-level token store 193 may send a control signal to the non-reorderable request selection circuit 181 (e.g., a multiplexer) of the request handling pipe 151.

In addition, the first-level token store 171 of the request handling pipe 151 may be also a FIFO register. In the cycle, the entry at the top of the first-level token store 171 may also be popped out of the first-level token store 171 to indicate the oldest non-reorderable device request (out of the non-reorderable device request currently stored across the buffers 161-162 of the request handling pipe 151 of the cache 32) to be transmitted. For example, the value at this entry may be 1 and thus indicate that this oldest non-reorderable device request is stored at the request buffer 161 of the request handling pipe 151. Similarly, the first-level token store 171 may send another control signal to the non-reorderable request selection circuit 181 (e.g., a multiplexer) of the request handling pipe 151. Thus, using the combination of the values at the second-level token store 193 and the first-level token store 171, the non-reorderable request selection circuit 181 may be able to identify that the oldest non-reorderable device request is stored at the request buffer 161 of the request handling pipe 151. In some embodiments, the request buffers 161 and 162 may be each implemented as FIFO buffers. Thus, in the cycle, each request buffers 161 and 162 may pop out and send a non-reorderable device request at the top of the two FIFO buffers to the non-reorderable request selection circuit 181. With the two control signals, the non-reorderable request selection circuit 181 may thus select the oldest non-reorderable device request from the request buffer 161 to be sent to a corresponding device. Alternatively, in some embodiments, the request buffers 161 and 162 may not necessarily use FIFO buffers. In that case, the values at the first-level token store 171 may further include information, e.g., device request ID's, to indicate the non-reorderable device requests stored at the request buffers 161-162. Thus, the non-reorderable request selection circuit 181 may use the information to select the oldest non-reorderable device request from the request buffer 161 to be sent out, according to the two control signals.

As described above, besides non-reorderable device requests, request buffers 161 and 162 may also store limited-reorderable device requests. Note that in some embodiments, regardless of the ordering attributes of the device requests, device requests to a same device may still need to remain in order. Thus, in the illustrated embodiment, the request handling pipe 151 may further include another first-level token store 271 to track the limited-reorderable device requests for a same device. Since the bank selection circuit 141 selects a request handling pipe to store a device request based on an address indicated by the device request, and these limited-reorderable device requests are directed to the same device, these limited-reorderable device requests may thus be stored within a same request handling pipe. As a result, there may not be necessary to use a second-level token store (e.g., like the second-level token store 191) to track the order in which these limited-reorderable device requests are stored across different request handling pipes 151-154 of the cache 32 (since they will not be stored at different request handling pipes).

In this example, assuming that the limited-reorderable device requests for a same device are stored at the request handling pipe 151, individual ones of the limited-reorderable device requests may be stored at the request buffers 161-162 according to the occupancy or available entries inside the request buffers 161-162, like the non-reorderable device requests as described above. In the illustrated embodiment, the request handling pipe 151 may include another first-level token store 271 to store values at indicate the order in which these limited-reorderable device requests are stored at the request buffers 161-162 of the request handling pipe 151. For example, a value 1 at the first-level token store 271 may correspond to a limited-reorderable device request stored at the request buffer 161, while a value 2 correspond to a limited-reorderable device request stored at the request buffer 162.

Thus, similar to the above-described operations for non-reorderable device requests, the request handling pipe 151 may use a limited-reorderable request selection circuit 281 (e.g., implemented as a multiplexer) to select the oldest one of these limited-reorderable device requests to be sent to the device. As indicated in FIG. 1, since the transmission of these limited-reorderable device requests may not necessarily use a second-level token store, the limited-reorderable request selection circuit 281 may only receive a control signal from the first-level token store 271. In some embodiments, the first-level token store 271 may be implemented using a FIFO register.

Note that in the illustrated embodiment, the cache 32 may further include a selection circuit 291. If a non-reorderable device request and a limited-orderable device request happen to be selected, respectively by the non-reorderable request selection circuit 181 and the limited-reorderable request selection circuit 281, to be sent during a same operational cycle, the selection circuit 291 may further select one of the two requests to be sent out from the request handling pipe 151. In some embodiments, the selection circuit 291 may make the selection according to a first-in first-out basis. In some other embodiments, the selection circuit 291 may assign a higher priority to non-reorderable device requests and thus transmit the non-reorderable device request before the limited-reorderable device request, or vice versa. In yet some other embodiments, the selection circuit 291 may perform the selection according to one or more alternative criteria, e.g., in a round-robin fashion, etc.

For limited-reorderable device requests to different devices, they may be transmitted out of the original order. Thus, the request handling pipe 151 may not necessarily need to use second-level or first-level token stores to track or maintain the order for transmitting these device requests.

In some embodiments, the cache 32 may be configured to send out only one device request each operational cycle. For example, during each operational cycle, the cache 32 may select one device request (e.g., the oldest non-reorderable or limited-reorderable device request) to be sent to a device. Alternatively, in some embodiments, the cache 32 may be configured to be able to select and send multiple device requests (that are older than the rest of the device requests) in one clock cycle. For example, the second-level token store 193 may be configured to determine whether multiple non-reorderable device requests that are older than the rest of the non-reorderable device requests stored at the cache 32 are stored consecutively at a same request handling pipe. For example, if the top three consecutive values at the second-level token store 193 are all 1, it may indicate that the oldest three non-reorderable device requests are stored consecutively at the request handling pipe 151. Accordingly, the second-level token store 193 may send a control signal to the request selection circuit 181 to indicate that all the three non-reorderable device requests may be sent together from the request handling pipe 151 during a same operational cycle.

Further, within the request handling pipe 151, the first-level token store 171 may be further configured to determine whether multiple non-reorderable device requests are stored consecutively at a same request buffer. In the foregoing example, if the top two consecutive values at the first-level token store 171 are both 1, that may mean that the oldest two of the three non-reorderable device requests are stored consecutively at the request buffer 161 of the request handling pipe 151. Accordingly, the first-level token store 171 may send a control signal to the request selection circuit 181 to indicate that two of the three non-reorderable device requests may be sent together from the request buffer 161 of the request handling pipe 151 during the same operational cycle. As a result, these two non-reorderable device requests may be selected together by the non-reorderable request selection circuit 181 from the request buffer 161 and sent to a device during the same operational cycle. For example, these two non-reorderable device requests may be allowed to pop out of the request buffer 161 together if the request buffer 161 is implemented using a FIFO register. Alternatively, the non-reorderable request selection circuit 181 may use the request ID's to select the two non-reorderable device requests from the request buffer 161. The foregoing operations may also apply to the transmission of limited-reorderable device requests to a same device. The ability to select and send multiple device requests together may increase the speed and efficiency of the cache 32.

Figure 3A:
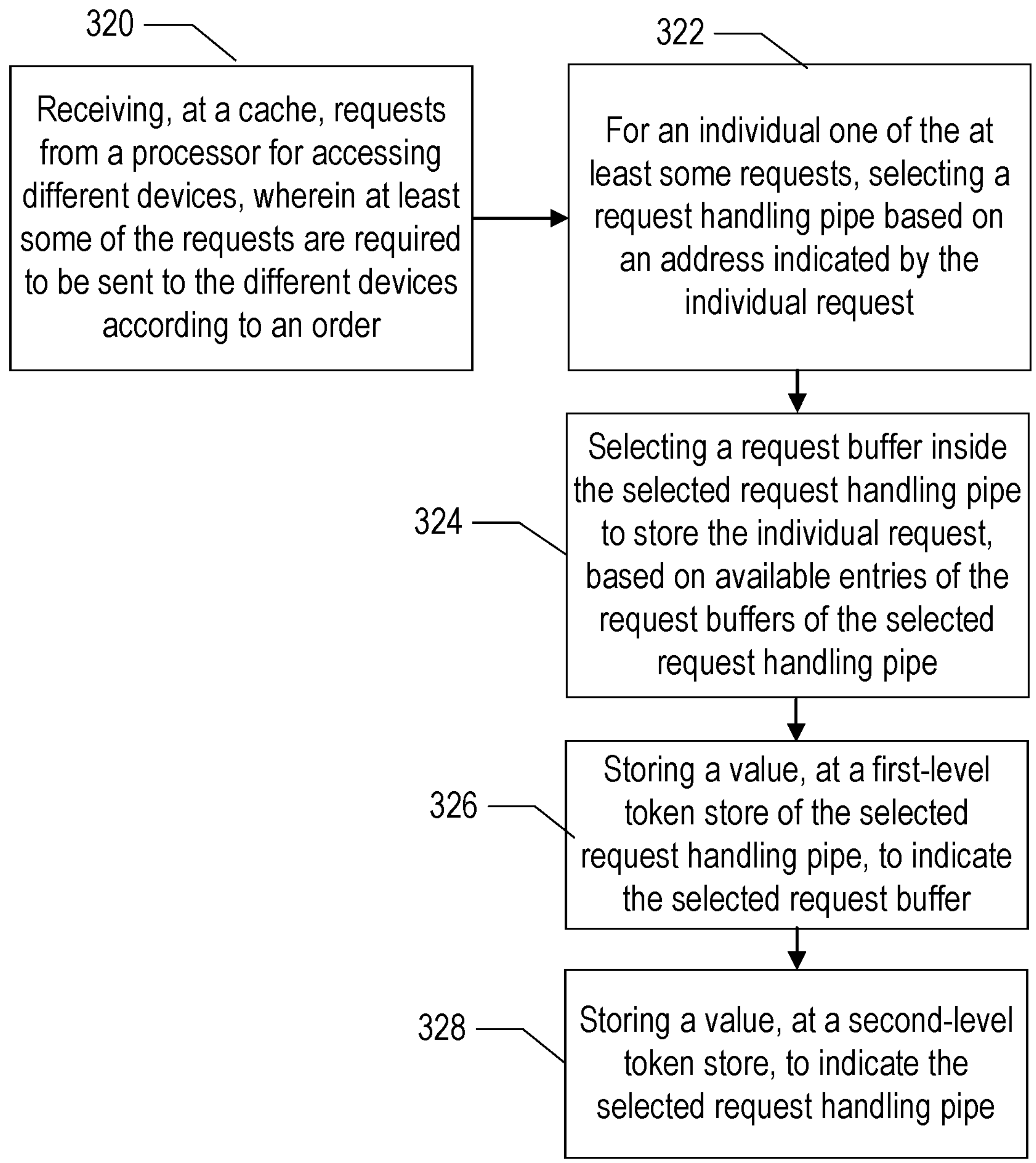
FIG. 3*a* is a flowchart illustrating one embodiment of operations of a cache for storing non-reorderable requests.

Turning to FIG. 3*a*, a flowchart illustrating one embodiment of operations of a cache for storing non-reorderable requests is shown. As described above, the cache 32 may receive requests from a processor for accessing different devices, where at least some of the requests may be non-reorderable device requests and require to be sent to the devices according to an order (block 320). In some embodiments, this order may be the temporal order in which the non-reorderable device requests are issued at the processor and received at the cache 32. For each one of the non-reorderable device requests, the cache 32 may select (e.g., using the bank selection circuit 141) a request handling pipe from the cache 32, based on an address indicated by the non-reorderable device request (block 322). Further, the cache may select a request buffer inside the selected request handling pipe, based on the occupancy or available entries of the request buffers of the selected request handling pipe to store the non-reorderable device request (block 324). In addition, the cache 32 may store (e.g., using the bank selection circuit 141) a value at the first-level token store (e.g., like the first-level token store 171) of the selected request handling pipe (e.g., like the request handling pipe 161) to indicate the selected request buffer (block 326), and store a value at the second-level token store (e.g., like the second-level token store 193) to indicate the selected request handling pipe (block 328). As described above, the values in the second-level token store may indicate the order in which the non-reorderable device requests are stored across the different request handling pipes of the cache 32, and for each request handling pipe, the values in the first-level token store of the request handling pipe may indicate the order in which a subset of the non-reorderable device requests are stored across the different request buffers of the request handling pipe.

Figure 3B:
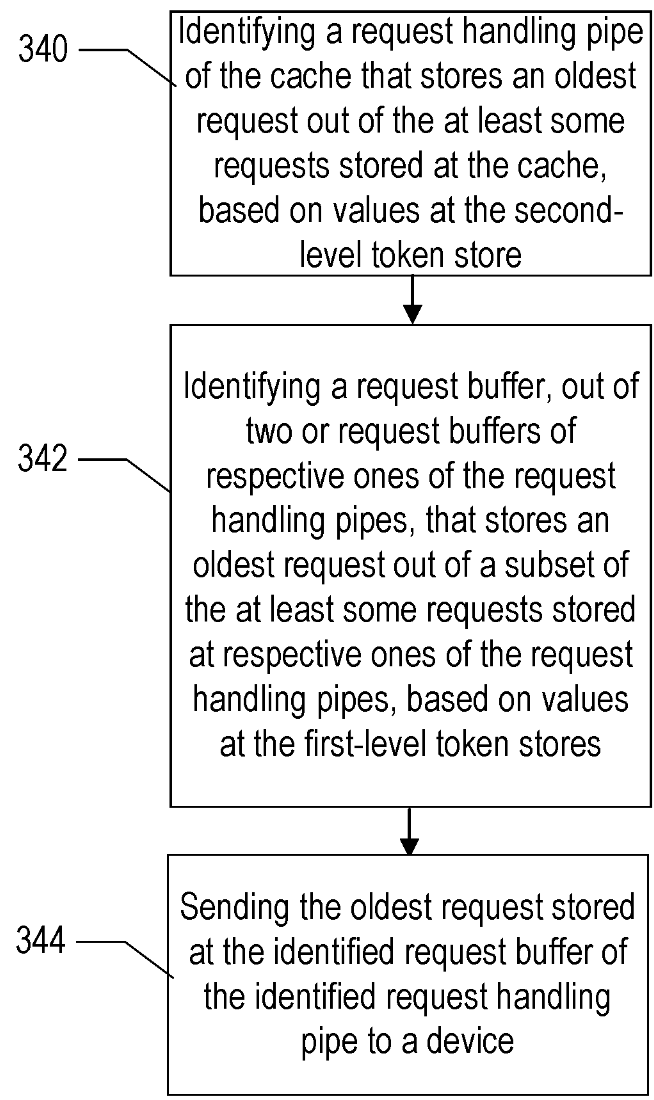
FIG. 3*b* is a flowchart illustrating one embodiment of operations of a cache for sending non-reorderable requests.

Turning to FIG. 3*b*, a flowchart illustrating one embodiment of operations of a cache for sending non-reorderable requests is shown. As described above, the cache 32 may identify (e.g., using the non-reorderable request selection circuit 181) a request handling pipe within the cache 32 that stores an oldest non-reorderable device request at the cache 32, based on the values at the second-level token store (block 340). In addition, the cache 32 may identify (e.g., using the non-reorderable request selection circuit 181) a request buffer within the identified request handling pipe that stores the oldest non-reorderable device request, based on the values at the first-level token store of the identified request handling pipe (block 342). Once the oldest non-reorderable device request is identified to be stored at the identified request buffer of the identified request handling pipe, the cache 32 may cause (e.g., using the non-reorderable request selection circuit 181) the oldest non-reorderable device request to be sent to a corresponding device (block 344).

Note that FIGS. 3*a*-3*b* are merely provided as examples to illustrate the operations of the cache 32, and do not limit the scope of the disclosure. For example, in FIG. 3*a*, although block 324 is displayed on top of block 328, it may not necessarily mean that block 324 has to be performed prior to block 328. Instead, in some embodiments, the cache 32 may store a value at the second-level token store (block 328) before the selection of the request buffer (block 324). Also, as described above, the cache 32 may include a token system for each different processor. For example, the cache 32 may use a first token system (including the second-level token store 193 and first-level token stores 171-174) to track and maintain the order of non-reorderable device requests from the processor 1, and a second token system (including the second-level token store 194 and first-level token stores 175-178) to track and maintain the order of non-reorderable device requests from the processor 2.

Figure 4A:
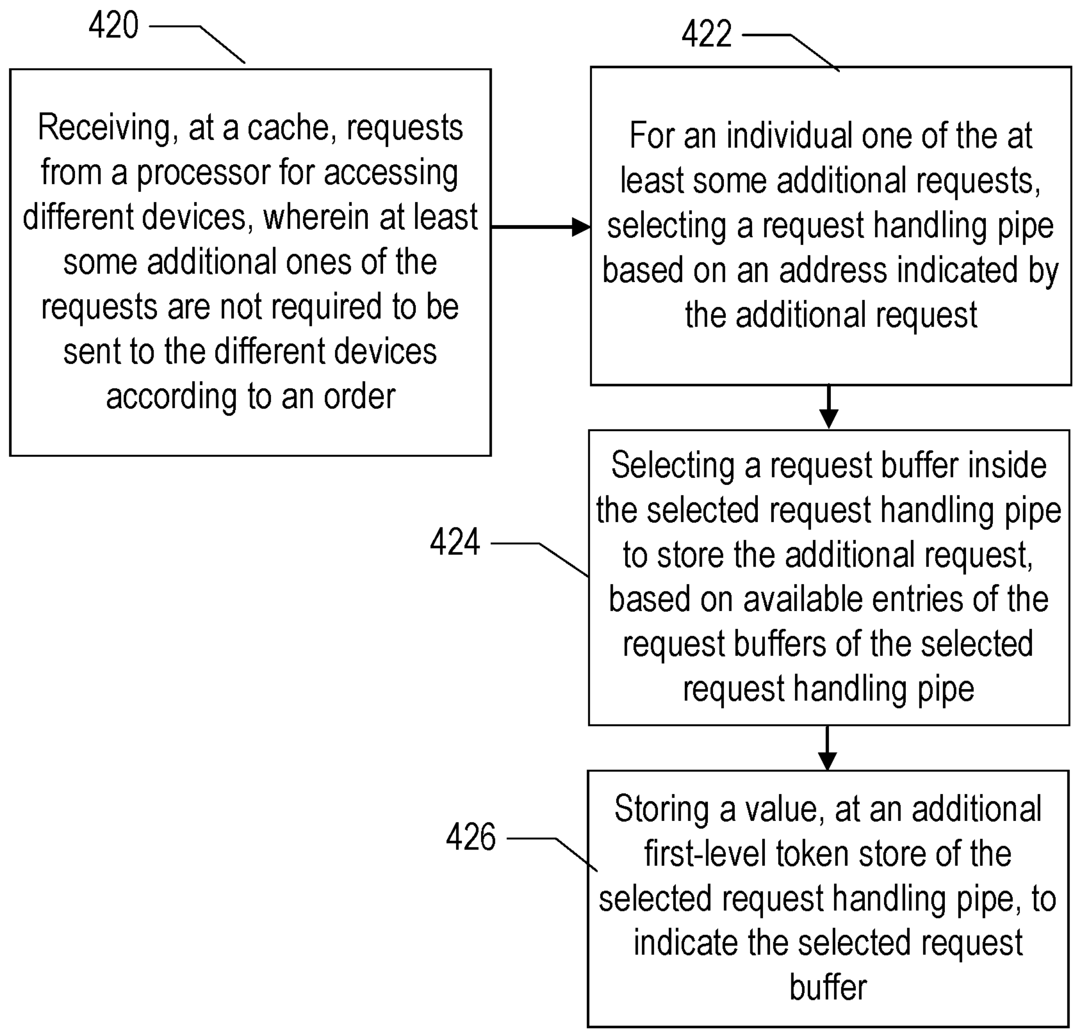
FIG. 4*a* is a flowchart illustrating one embodiment of operations of a cache for storing limited-reorderable requests.

Turning to FIG. 4*a*, a flowchart illustrating one embodiment of operations of a cache for storing limited-reorderable device requests is shown. By comparison with FIG. 3*a*, it may be seen that for the limited-reorderable device requests, the cache 32 may operate in a manner substantially similar to that for non-reorderable device requests as illustrated in FIG. 3*a*, except the lack of a second-level token store. For example, as indicated in FIG. 4*a*, the cache 32 may receive requests from a processor for accessing different devices, where at least some of the requests may be limited-reorderable device requests and not necessarily require to be sent to the devices according to an order (block 420). For each one of the limited-reorderable device requests, the cache 32 may select (e.g., using a bank selection circuit 141) a request handling pipe from the cache 32, based on an address indicated by the limited-reorderable device request (block 422). Further, the cache may select a request buffer inside the selected request handling pipe, based on the occupancy or available entries of the request buffers of the selected request handling pipe to store the limited-reorderable device request (block 424). In addition, the cache 32 may store a value at a first-level token store (e.g., the first-level token store 271) of the selected request handling pipe to indicate the selected request buffer (block 326). As described above, the values in the first-level token store of a request handling pipe may indicate the order in which a subset of the limited-reorderable device requests are stored across the different request buffers of the request handling pipe. Note that the cache 32 may not necessarily use a second-level token store (e.g., like the second-level token store 193) to track the order in which the limited-reorderable device requests are stored across different request handling pipes of the cache 32, because the cache 32 only needs to track and maintain the order for limited-reorderable device requests directed to a same device, but these device requests are stored within a same request handling pipe.

Figure 4B:
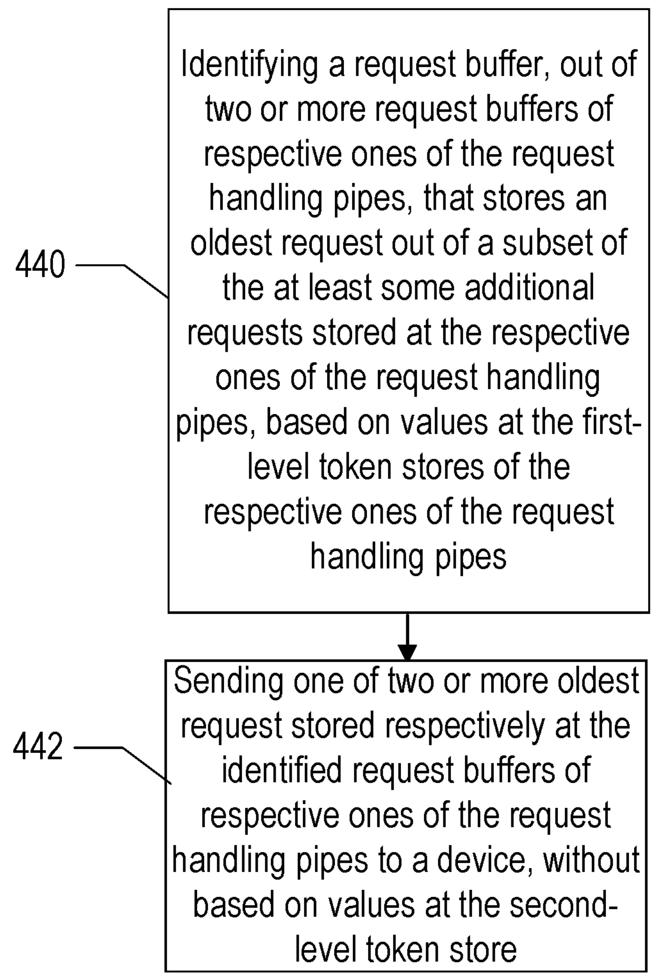
FIG. 4*b* is a flowchart illustrating one embodiment of operations of a cache for sending limited-reorderable requests.

Turning to FIG. 4*b*, a flowchart illustrating one embodiment of operations of a cache for sending limited-reorderable requests that are directed to a same device is shown. In FIG. 4*b*, for each request handling pipe, the cache 32 may identify (e.g., using the limited-reorderable request selection circuit 281) a request buffer out of the multiple request buffers of the request handling pipe that stores an oldest one of a subset of the limited-reorderable device requests at the request handling pipe, based on the values at the limited-reorderable first-level token store (e.g., the limited-reorderable token store 271) of the request handling pipe (block 440). Next, among the several oldest limited-reorderable device requests identified respectively from the different request handling pipes 151-154 of the cache 32, the cache 32 may select one of them to be sent to a device (block 442). In some embodiments, the cache 32 may make the selection according to various criteria. For example, the cache 32 may make the selection according to a first-in first-out basis. In another example, the cache 32 may assign different priorities to the request handling pipes 151-154 and make the selection between the different request handling pipes according to the priorities of the respective request handling pipes 151-154. Alternatively, the cache 32 may perform the selection according to a first-in first out basis, a round-robin fashion, etc. Note that in the foregoing operations, unlike the case for non-reorderable device requests, the cache 32 may not necessarily use a second-level token store for the limited-reorderable requests.

Figure 5:
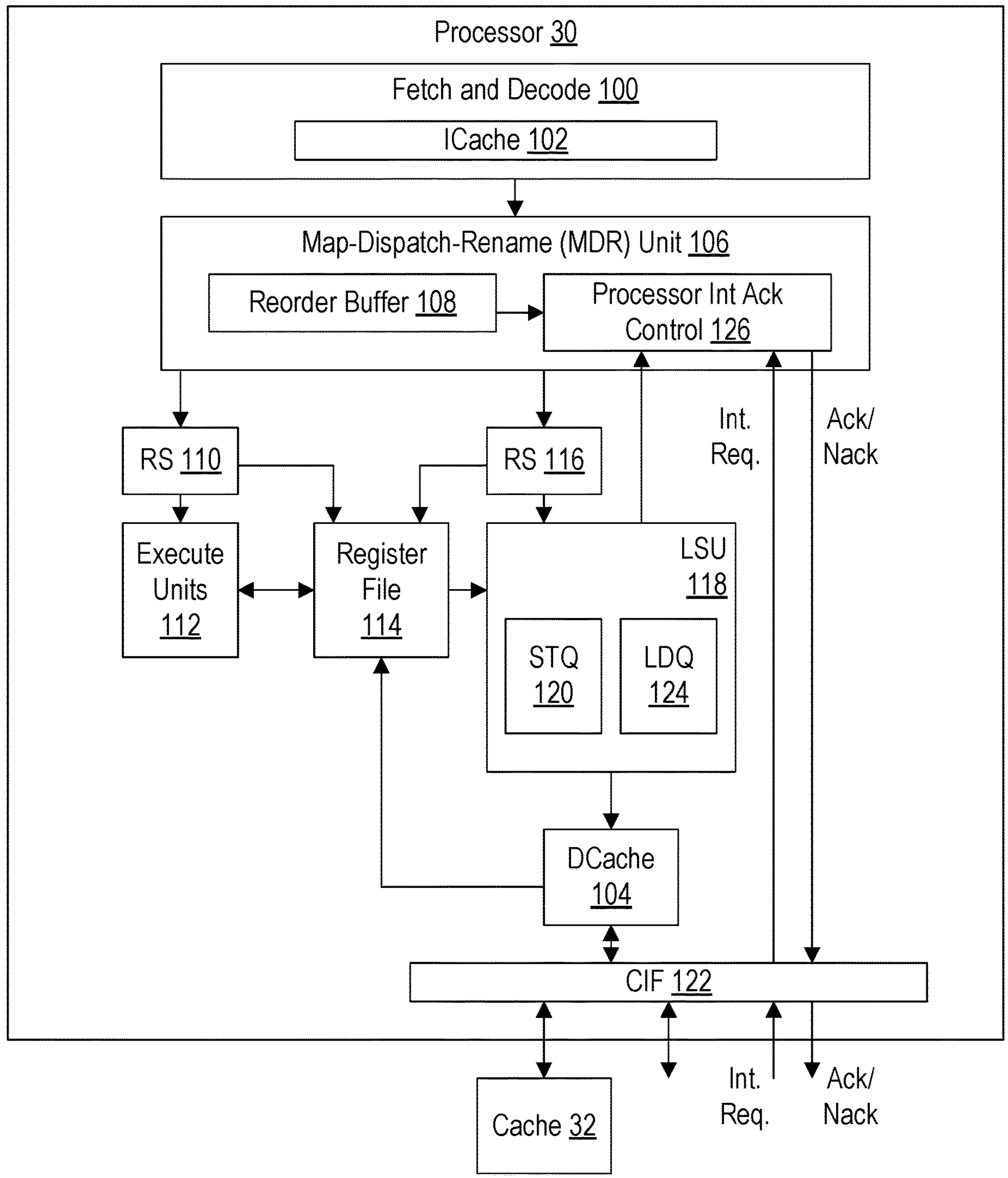
FIG. 5 is a block diagram of one embodiment of a processor including a cache shown in FIG. 1.

FIG. 5 is a block diagram of one embodiment of a processor 30 that includes the cache 32 as described in FIGS. 1-4 is shown. In the illustrated embodiment, the processor 30 includes a fetch and decode unit 100 (including an instruction cache, or ICache, 102), a map-dispatch-rename (MDR) unit 106 (including a reorder buffer circuit (ROB) 108 and a processor interrupt acknowledgement controller 126), one or more reservation stations 110, one or more execute units 112, a register file 114, a data cache (DCache) 104, a load/store unit (LSU) 118, a reservation station (RS) for the load/store unit 116, and a core interface unit (CIF) 122. The fetch and decode unit 100 is coupled to the MDR unit 106, which is coupled to the reservation stations 110, the reservation station 116, and the LSU 118. The reservation stations 110 are coupled to the execution units 28. The register file 114 is coupled to the execute units 112 and the LSU 118. The LSU 118 is also coupled to the DCache 104, which is coupled to the CIF 122 and the register file 114. The LSU 118 includes a store queue 120 (STQ 120) and a load queue (LDQ 124).

The fetch and decode unit 100 may be configured to fetch instructions for execution by the processor 30 and decode the instructions into ops for execution. More particularly, the fetch and decode unit 100 may be configured to cache instructions previously fetched from memory (through the CIF 122) in the ICache 102, and may be configured to fetch a speculative path of instructions for the processor 30. The fetch and decode unit 100 may implement various prediction structures to predict the fetch path. For example, a next fetch predictor may be used to predict fetch addresses based on previously executed instructions. Branch predictors of various types may be used to verify the next fetch prediction, or may be used to predict next fetch addresses if the next fetch predictor is not used. The fetch and decode unit 100 may be configured to decode the instructions into instruction operations. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 30 may be decoded into a single instruction operation, and thus the instruction operation may be essentially synonymous with instruction (although it may be modified in form by the decoder). The term "instruction operation" may be more briefly referred to herein as "operation" or "op."

The MDR unit 106 may be configured to map the ops to speculative resources (e.g., physical registers) to permit out-of-order and/or speculative execution, and may dispatch the ops to the reservation stations 110 and 116. The ops may be mapped to physical registers in the register file 114 from the architectural registers used in the corresponding instructions. That is, the register file 114 may implement a set of physical registers that may be greater in number than the architectural registers specified by the instruction set architecture implemented by the processor 30. The MDR unit 106 may manage the mapping of the architectural registers to physical registers. There may be separate physical registers for different operand types (e.g., integer, media, floating point, etc.) in an embodiment. In other embodiments, the physical registers may be shared over operand types. The MDR unit 106 may also be responsible for tracking the speculative execution and retiring ops or flushing misspeculated ops. The reorder buffer 108 may be used to track the program order of ops and manage retirement/flush. That is, the reorder buffer 108 may be configured to track a plurality of instruction operations corresponding to instructions fetched by the processor and not retired by the processor.

Ops may be scheduled for execution when the source operands for the ops are ready. In the illustrated embodiment, decentralized scheduling is used for each of the execution units 28 and the LSU 118, e.g., in reservation stations 116 and 110. Other embodiments may implement a centralized scheduler if desired.

The LSU 118 may be configured to execute load/store memory ops. Generally, a memory operation (memory op) may be an instruction operation that specifies an access to memory (although the memory access may be completed in a cache such as the DCache 104). A load memory operation may specify a transfer of data from a memory location to a register, while a store memory operation may specify a transfer of data from a register to a memory location. Load memory operations may be referred to as load memory ops, load ops, or loads; and store memory operations may be referred to as store memory ops, store ops, or stores. In an embodiment, store ops may be executed as a store address op and a store data op. The store address op may be defined to generate the address of the store, to probe the cache for an initial hit/miss determination, and to update the store queue with the address and cache info. Thus, the store address op may have the address operands as source operands. The store data op may be defined to deliver the store data to the store queue. Thus, the store data op may not have the address operands as source operands, but may have the store data operand as a source operand. In many cases, the address operands of a store may be available before the store data operand, and thus the address may be determined and made available earlier than the store data. In some embodiments, it may be possible for the store data op to be executed before the corresponding store address op, e.g., if the store data operand is provided before one or more of the store address operands. While store ops may be executed as store address and store data ops in some embodiments, other embodiments may not implement the store address/store data split. The remainder of this disclosure will often use store address ops (and store data ops) as an example, but implementations that do not use the store address/store data optimization are also contemplated. The address generated via execution of the store address op may be referred to as an address corresponding to the store op.

Figure 6:
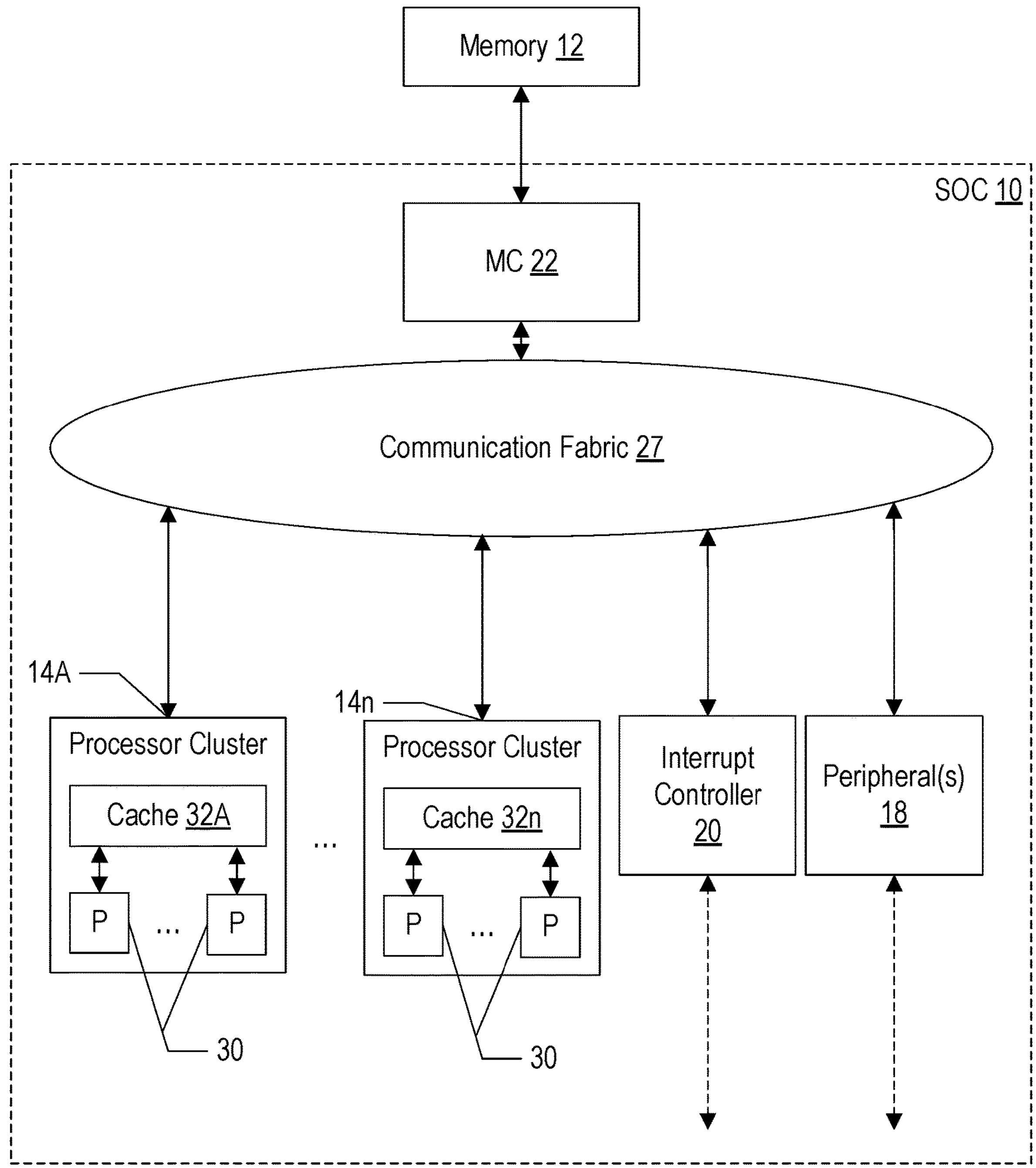
FIG. 6 is a block diagram of one embodiment of system on a chip (SOC) that may include one or more processors shown in FIG. 5.

Load/store ops may be received in the reservation station 116, which may be configured to monitor the source operands of the operations to determine when they are available and then issue the operations to the load or store pipelines, respectively. Some source operands may be available when the operations are received in the reservation station 116, which may be indicated in the data received by the reservation station 116 from the MDR unit 106 for the corresponding operation. Other operands may become available via execution of operations by other execution units 112 or even via execution of earlier load ops. The operands may be gathered by the reservation station 116, or may be read from a register file 114 upon issue from the reservation station 116 as shown in FIG. 6.

In an embodiment, the reservation station 116 may be configured to issue load/store ops out of order (from their original order in the code sequence being executed by the processor 30, referred to as "program order") as the operands become available. To ensure that there is space in the LDQ 124 or the STQ 120 for older operations that are bypassed by younger operations in the reservation station 116, the MDR unit 106 may include circuitry that preallocates LDQ 124 or STQ 120 entries to operations transmitted to the load/store unit 118. If there is not an available LDQ entry for a load being processed in the MDR unit 106, the MDR unit 106 may stall dispatch of the load op and subsequent ops in program order until one or more LDQ entries become available. Similarly, if there is not a STQ entry available for a store, the MDR unit 106 may stall op dispatch until one or more STQ entries become available. In other embodiments, the reservation station 116 may issue operations in program order and LRQ 46/STQ 120 assignment may occur at issue from the reservation station 116.

The LDQ 124 may track loads from initial execution to retirement by the LSU 118. The LDQ 124 may be responsible for ensuring the memory ordering rules are not violated (between out of order executed loads, as well as between loads and stores). If a memory ordering violation is detected, the LDQ 124 may signal a redirect for the corresponding load. A redirect may cause the processor 30 to flush the load and subsequent ops in program order, and refetch the corresponding instructions. Speculative state for the load and subsequent ops may be discarded and the ops may be refetched by the fetch and decode unit 100 and reprocessed to be executed again.

When a load/store address op is issued by the reservation station 116, the LSU 118 may be configured to generate the address accessed by the load/store, and may be configured to translate the address from an effective or virtual address created from the address operands of the load/store address op to a physical address actually used to address memory. The LSU 118 may be configured to generate an access to the DCache 104. For load operations that hit in the DCache 104, data may be speculatively forwarded from the DCache 104 to the destination operand of the load operation (e.g., a register in the register file 114), unless the address hits a preceding operation in the STQ 120 (that is, an older store in program order) or the load is replayed. The data may also be forwarded to dependent ops that were speculatively scheduled and are in the execution units 112. The execution units 112 may bypass the forwarded data in place of the data output from the register file 114, in such cases. If the store data is available for forwarding on a STQ hit, data output by the STQ 120 may forwarded instead of cache data.

Cache misses and STQ hits where the data cannot be forwarded may be reasons for replay and the load data may not be forwarded in those cases. The cache hit/miss status from the DCache 104 may be logged in the STQ 120 or LDQ 124 for later processing.

The LSU 118 may implement multiple load pipelines. For example, in an embodiment, three load pipelines ("pipes") may be implemented, although more or fewer pipelines may be implemented in other embodiments. Each pipeline may execute a different load, independent and in parallel with other loads. That is, the RS 116 may issue any number of loads up to the number of load pipes in the same clock cycle. The LSU 118 may also implement one or more store pipes, and in particular may implement multiple store pipes. The number of store pipes need not equal the number of load pipes, however. In an embodiment, for example, two store pipes may be used. The reservation station 116 may issue store address ops and store data ops independently and in parallel to the store pipes. The store pipes may be coupled to the STQ 120, which may be configured to hold store operations that have been executed but have not committed.

The CIF 122 may be responsible for communicating with the rest of a system including the processor 30, on behalf of the processor 30. For example, the CIF 122 may be configured to request data for DCache 104 misses and ICache 102 misses. When the data is returned, the CIF 122 may signal the cache fill to the corresponding cache. For DCache fills, the CIF 122 may also inform the LSU 118. The LDQ 124 may attempt to schedule replayed loads that are waiting on the cache fill so that the replayed loads may forward the fill data as it is provided to the DCache 104 (referred to as a fill forward operation). If the replayed load is not successfully replayed during the fill, the replayed load may subsequently be scheduled and replayed through the DCache 104 as a cache hit. The CIF 122 may also writeback modified cache lines that have been evicted by the DCache 104, merge store data for non-cacheable stores, etc. In another example, the CIF 122 can communicate interrupt-related signals for the processor 30, e.g., interrupt requests and/or acknowledgement/non-acknowledgement signals from/to a peripheral device of the system including the processor 30.

The execution units 112 may include any types of execution units in various embodiments. For example, the execution units 112 may include integer, floating point, and/or vector execution units. Integer execution units may be configured to execute integer ops. Generally, an integer op is an op which performs a defined operation (e.g., arithmetic, logical, shift/rotate, etc.) on integer operands. Integers may be numeric values in which each value corresponds to a mathematical integer. The integer execution units may include branch processing hardware to process branch ops, or there may be separate branch execution units.

Floating point execution units may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g., base 2, in an embodiment).

Vector execution units may be configured to execute vector ops. Vector ops may be used, e.g., to process media data (e.g., image data such as pixels, audio data, etc.). Media processing may be characterized by performing the same processing on significant amounts of data, where each datum is a relatively small value (e.g., 8 bits, or 16 bits, compared to 32 bits to 64 bits for an integer). Thus, vector ops include single instruction-multiple data (SIMD) or vector operations on an operand that represents multiple media data.

Thus, each execution unit 112 may comprise hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit may be an independent pipe for executing ops. Different execution units may have different execution latencies (e.g., different pipe lengths). Additionally, different execution units may have different latencies to the pipeline stage at which bypass occurs, and thus the clock cycles at which speculative scheduling of depend ops occurs based on a load op may vary based on the type of op and execution unit 28 that will be executing the op.

It is noted that any number and type of execution units 112 may be included in various embodiments, including embodiments having one execution unit and embodiments having multiple execution units.

A cache line may be the unit of allocation/deallocation in a cache. That is, the data within the cache line may be allocated/deallocated in the cache as a unit. Cache lines may vary in size (e.g., 32 bytes, 64 bytes, 128 bytes, or larger or smaller cache lines). Different caches may have different cache line sizes. The ICache 102 and DCache 104 may each be a cache having any desired capacity, cache line size, and configuration. There may be more additional levels of cache between the DCache 104/ICache 102 and the main memory, in various embodiments.

At various points, load/store operations are referred to as being younger or older than other load/store operations. A first operation may be younger than a second operation if the first operation is subsequent to the second operation in program order. Similarly, a first operation may be older than a second operation if the first operation precedes the second operation in program order.

As indicted in FIG. 5, the processor 30 may communicate with the cache 32 through the CIF 122. In addition, in the illustrated embodiment, the cache 32 may be a last-level cache (LLC) that may be shared by the processor 30 together with one or more additional processors of a system on chip (SOC) 10, as illustrated in FIG. 6. As described above, the cache 32 may include a token system for each of the processors, to track and maintain the transmission of the device requests from a processor in order (as needed).

Turning now to FIG. 6, a block diagram one embodiment of a system 10 that may include one or more processors 30 is shown. In the illustrated embodiment, the system 10 may be implemented as a system on a chip (SOC) 10 coupled to a memory 12. As implied by the name, the components of the SOC 10 may be integrated onto a single semiconductor substrate as an integrated circuit "chip." In some embodiments, the components may be implemented on two or more discrete chips in a system. However, the SOC 10 will be used as an example herein. In the illustrated embodiment, the components of the SOC 10 include a plurality of processor clusters 14A-14*n*, the interrupt controller 20, one or more peripheral components 18 (more briefly, "peripherals"), a memory controller 22, and a communication fabric 27. The components 14A-14*n*, 18, 20, and 22 may all be coupled to the communication fabric 27. The memory controller 22 may be coupled to the memory 12 during use. In some embodiments, there may be more than one memory controller coupled to corresponding memory. The memory address space may be mapped across the memory controllers in any desired fashion. In the illustrated embodiment, the processor clusters 14A-14*n* may individually include a cache, e.g., caches 32A-32*n*, that may be a last-level cache (LLC) shared by the processors (P) 30 of the respective processor clusters 14A-14*n*. The processors 30 may form the central processing units (CPU(s)) of the SOC 10. In an embodiment, one or more processor clusters 14A-14*n* may not be used as CPUs.

As mentioned above, the processor clusters 14A-14*n* may include one or more processors 30 that may serve as the CPU of the SOC 10. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors.

Generally, a processor may include any circuitry and/or microcode configured to execute instructions defined in an instruction set architecture implemented by the processor. Processors may encompass processor cores implemented on an integrated circuit with other components as a system on a chip (SOC 10) or other levels of integration. Processors may further encompass discrete microprocessors, processor cores and/or microprocessors integrated into multichip module implementations, processors implemented as multiple integrated circuits, etc.

The memory controller 22 may generally include the circuitry for receiving memory operations from the other components of the SOC 10 and for accessing the memory 12 to complete the memory operations. The memory controller 22 may be configured to access any type of memory 12. For example, the memory 12 may be static random-access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g., LPDDR, mDDR, etc.). The memory controller 22 may include queues for memory operations, for ordering (and potentially reordering) the operations and presenting the operations to the memory 12. The memory controller 22 may further include data buffers to store write data awaiting write to memory and read data awaiting return to the source of the memory operation. In some embodiments, the memory controller 22 may include a memory cache to store recently accessed memory data. In SOC implementations, for example, the memory cache may reduce power consumption in the SOC by avoiding reaccess of data from the memory 12 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 22.

The peripherals 18 may be any set of additional hardware functionality included in the SOC 10. For example, the peripherals 18 may include video peripherals such as an image signal processor configured to process image capture data from a camera or other image sensor, GPUs, video encoder/decoders, scalers, rotators, blenders, display controller, etc. The peripherals may include audio peripherals such as microphones, speakers, interfaces to microphones and speakers, audio processors, digital signal processors, mixers, etc. The peripherals may include interface controllers for various interfaces external to the SOC 10 including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

It is noted that the number of components of the SOC 10 (and the number of subcomponents for those shown in FIG. 4, such as the processors 30 in each processor cluster 14A-14*n* may vary from embodiment to embodiment. Additionally, the number of processors 30 in one processor cluster 14A-14*n* may differ from the number of processors 30 in another processor cluster 14A-14*n*. There may be more or fewer of each component/subcomponent than the number shown in FIG. 4.

As indicated in FIGS. 1-6, in one embodiment, an apparatus may include two or more request handling pipes, a second-level token store, a bank selection circuit, and a request selection circuit. The one or more request handling pipes may respectively include (a) two or more request buffers configured to store requests from a processor for accessing different devices, wherein at least some of the requests are required to be sent to the different devices according to a temporal order, and (b) a first-level token store. For an individual one of the at least some requests from the processor, the bank selection circuit may be configured to select one request handling pipe and one request buffer of the selected one request handling pipe to store the individual request; store, at the first-level token store of the selected one request handling pipe, a value indicating the selected one request buffer of the selected one request handling pipe in which the individual request is stored; and store, at the second-level token store, a value indicating the selected one request handling pipe in which the individual request is stored. The request selection circuit may be configured to receive an indication of a request handling pipe selected out of the two or more request handling pipes, based on the values at the second-level token store, that stores an oldest request out of the at least some requests stored at the two or more request handling pipes; for respective ones of the two or more request handling pipes, receive an indication of a request buffer selected out of the two or more request buffers of the respective ones of the request handling pipes, based on the values at the first-level token stores of the respective ones of the request handling pipes, that stores an oldest request out of a subset of the at least some requests stored at the two or more request buffers of the respective ones of the request handling pipes; and send the oldest request stored at the indicated request buffer of the indicated request handling request to one of the devices.

In addition, in one embodiment, to select the one request handling pipe and the one request buffer to store the individual request, the bank selection circuit may be configured to select the one request handling pipe out of the two or more request handling pipes based on an address indicated by the individual request; and select the one request buffer out of the two or more request buffers of the selected one request handling pipe based on available entries inside the two or more request buffers of the selected one request handling pipe.

Computer System

Figure 7:
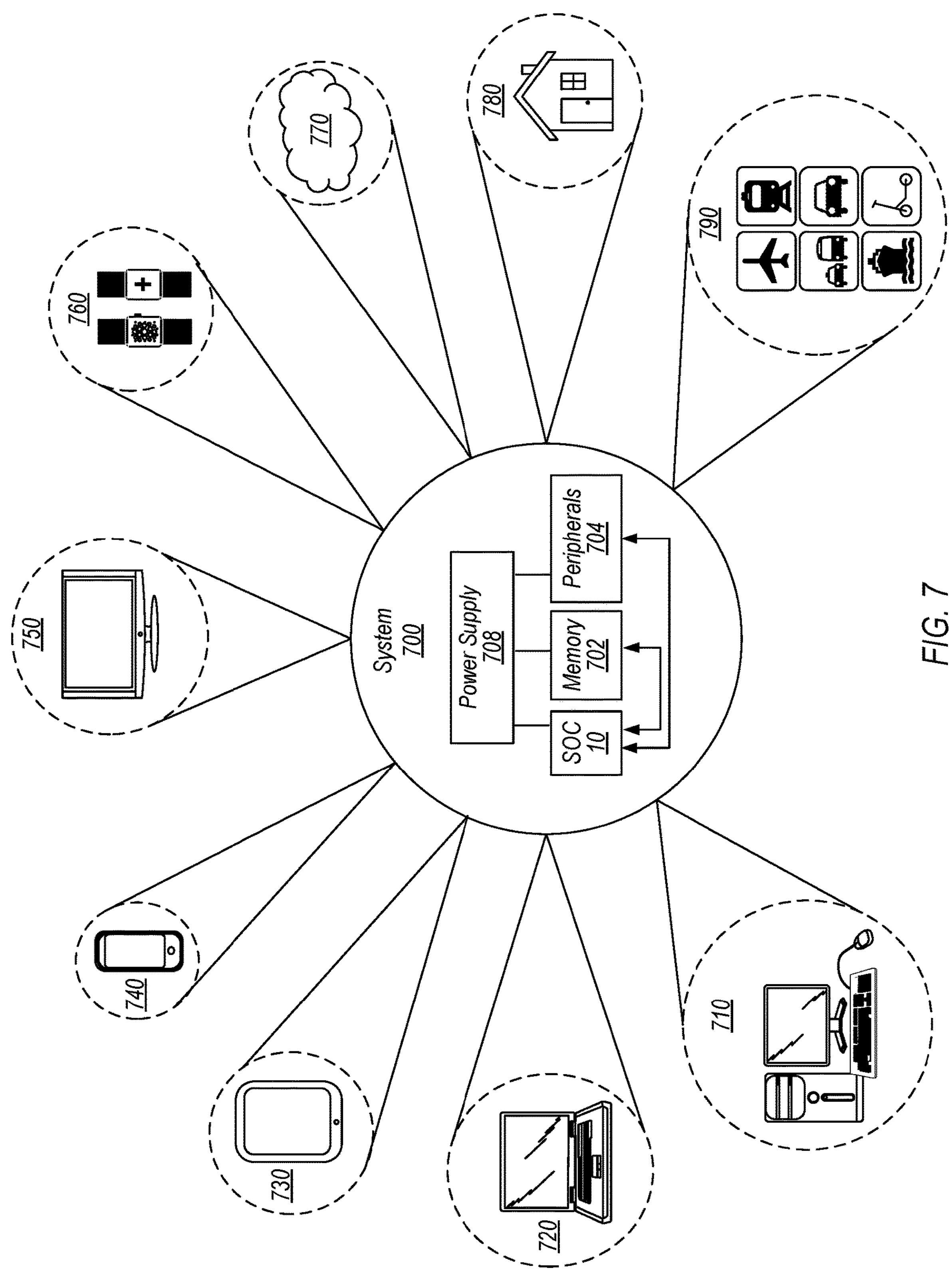
FIG. 7 is a block diagram of one embodiment of a system used in a variety of contexts.

Turning next to FIG. 7, a block diagram of one embodiment of a system 700 is shown. In the illustrated embodiment, the system 700 includes at least one instance of a system on a chip (SOC) 10 in FIG. 6 coupled to one or more peripherals 704 and an external memory 702. As described above, the SOC 10 may include one or more processors (P) 30, where some of the processors (P) 30 may share a cache 32 (e.g., a last-level cache or LLC) as described above in FIGS. 1-6. A power supply (PMU) 708 is provided which supplies the supply voltages to the SOC 10 as well as one or more supply voltages to the memory 702 and/or the peripherals 154. In some embodiments, more than one instance of the SOC 10 (e.g., the SOCs 10A-10*q*) may be included (and more than one memory 702 may be included as well). The memory 702 may include the memory 12 illustrated in FIG. 6, in an embodiment.

The peripherals 704 may include any desired circuitry, depending on the type of system 700. For example, in one embodiment, the system 704 may be a mobile device (e.g., personal digital assistant (PDA), smart phone, etc.) and the peripherals 704 may include devices for various types of wireless communication, such as Wi-Fi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc. In other embodiments, the system 700 may be any type of computing system (e.g., desktop personal computer, laptop, workstation, net top etc.).

The external memory 702 may include any type of memory. For example, the external memory 702 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 702 may include one or more memory modules to which the memory devices are mounted, such as single inline memory modules (SIMMs), dual inline memory modules (DIMMs), etc. Alternatively, the external memory 702 may include one or more memory devices that are mounted on the SOC 10 in a chip-on-chip or package-on-package implementation.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 7 is the application of system 700 to various modes of transportation. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 7 are illustrative only and are not intended to be limiting. Other devices are possible and are contemplated.

Computer Readable Storage Medium

Figure 8:
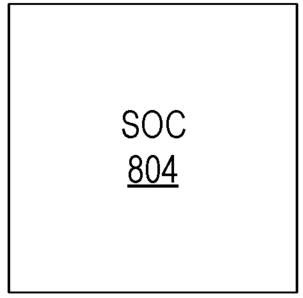
FIG. 8 is a block diagram of a computer accessible storage medium.

Turning now to FIG. 8, a block diagram of one embodiment of a computer readable storage medium 800 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 800 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 800 in FIG. 8 may store a database 804 representative of the SOC 10 in FIG. 6. As described above, the SOC 10 may include one or more processors (P) 30, where some of the processors (P) 30 may share a cache 32 (e.g., a last-level cache or LLC) as described above in FIGS. 1-6. Generally, the database 804 may be a database which can be read by a program and used, directly or indirectly, to fabricate the hardware comprising the SOC 10. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 10. The netlist may then be placed and routed to produce a data set describing geometric shapes to be applied to masks. The masks may then be used in various semiconductor fabrication steps to produce a semiconductor circuit or circuits corresponding to the SOC 10. Alternatively, the database 804 on the computer accessible storage medium 800 may be the netlist (with or without the synthesis library) or the data set, as desired.

While the computer accessible storage medium 800 stores a representation of the SOC 10, other embodiments may carry a representation of any portion of the SOC 10, as desired, including any subset of the components shown in FIG. 4. The database 804 may represent any portion of the above.

***

The present disclosure includes references to "an""embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Further-more, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

***

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to."

Similarly, the phrase "in response to" is synonymous with the phrase "at least in part in response to."

***

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated.

Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus, comprising:
- two or more request handling pipes respectively comprising (a) two or more request buffers configured to store requests from a processor for accessing different devices, wherein at least some of the requests are required to be sent to the different devices according to a temporal order, and (b) a first-level token store;
- a second-level token store;
- a bank selection circuit configured to:
  - for an individual one of the at least some requests from the processor,
    - select one request handling pipe and one request buffer to store the individual request, wherein the one request handling pipe is selected out of the two or more request handling pipes based on an address indicated by the individual request, and wherein the one request buffer is selected out of the two or more request buffers of the selected one request handling pipe based on available entries inside the two or more request buffers of the selected one request handling pipe;
    - store, at the first-level token store of the selected one request handling pipe, a value indicating the selected one request buffer of the selected one request handling pipe in which the individual request is stored; and
    - store, at the second-level token store, a value indicating the selected one request handling pipe in which the individual request is stored; and
- a request selection circuit configured to send the at least some requests to the different devices, using values at first-level token stores of the request handling pipes and values at the second token store.

2. The apparatus of claim 1, wherein to send the at least some requests to the different devices according to the temporal order, the request selection circuit is configured to:
- receive an indication of a request handling pipe selected out of the two or more request handling pipes, based on the values at the second-level token store, that stores an oldest request out of the at least some requests stored at the two or more request handling pipes;
- for respective ones of the two or more request handling pipes, receive an indication of a request buffer selected out of the two or more request buffers of the respective ones of the request handling pipes, based on the values at the first-level token stores of the respective ones of the request handling pipes, that stores an oldest request out of a subset of the at least some requests stored at the two or more request buffers of the respective ones of the request handling pipes; and
- send the oldest request stored at the indicated request buffer of the indicated request handling pipe to one of the devices.

3. The apparatus of claim 1, wherein to send the at least some requests to the different devices according to the temporal order, the request selection circuit is configured to:
- receive one or more indications of a request handling pipe selected out of the two or more request handling pipes, based on the values at the second-level token store, that stores one or more requests consecutively that are older than remaining ones of the at least some requests stored at the two or more request handling pipes;
- for respective ones of the two or more request handling pipes, receive one or more indications of a request buffer selected out of the two or more request buffers of the respective ones of the request handling pipes, based on the values at the first-level token stores of the respective ones of the request handling pipes, that stores one or more requests consecutively that are older than remaining ones of a subset of the at least some requests stored at the two or more request buffers of the respective ones of the request handling pipes; and
- send the one or more requests stored consecutively at the indicated request buffer of the indicated request handling pipe to one of the devices.

4. The apparatus of claim 1,
- wherein at least some additional ones of the requests from the processor are not required to be sent to the different devices according to the temporal order,
- wherein the two or more request handling pipes respectively further comprise an additional first-level token store,
- wherein the bank selection unit is further configured to:
  - for an individual one of the at least some additional requests from the processor,
    - select one request handling pipe and one request buffer to store the additional request, wherein the one request handling pipe is selected out of the two or more request handling pipes based on an address indicated by the additional request, and wherein the one request buffer is selected out of the two or more request buffers of the selected one request handling pipe based on available entries inside the two or more request buffers of the selected one request handling pipe; and
    - store, at the additional first-level token store of the selected one request handling pipe, a value indicating the selected one request buffer of the selected one request handling pipe in which the additional request is stored, and
- wherein the apparatus further comprises an additional request selection circuit configured to:
  - send the at least some additional requests to the different devices, using values at additional first-level token stores of the two or more request handling pipes.

5. The apparatus of claim 4, wherein to send the at least some additional requests to the different devices, the additional request selection circuit is configured to:
- for respective ones of the two or more request handling pipes, identify a request buffer out of the two or more request buffers of the respective ones of the request handling pipes, using the values at the additional first-level token stores of the respective ones of the request handling pipes, wherein the identified request buffer stores an oldest request out of a subset of the at least some additional requests stored at the two or more request buffers of the respective ones of the request handling pipes; and send one of two or more oldest requests stored respectively at the identified request buffers of the respective ones of the two or more request handling pipes to one of the devices, without using the values at the second-level token store.

6. The apparatus of claim 1, wherein the first-level token stores are implemented using first-in first-out (FIFO) registers, wherein the second-level token store is implemented using an additional first-in first-out (FIFO) register, and wherein requests stored at a request buffer of a request handling pipe are maintained in the temporal order in that particular buffer.

7. The apparatus of claim 1, wherein the request buffers of the two or more request handling pipes are further configured to store additional requests from a different processor that are required to be sent to the different devices according to a second temporal order, wherein the two or more request handling pipes respectively further comprise an additional first-level token store, and wherein the apparatus further comprises:

an additional second-level token store; and an additional bank selection circuit configured to:

for an individual one of the additional requests from the different processor, select one request handling pipe and one request buffer to store the additional request, wherein the one request handling pipe is selected out of the two or more request handling pipes based on an address indicated by the additional request, and wherein the one request buffer is selected out of the two or more request buffers of the selected one request handling pipe based on available entries inside the two or more request buffers of the selected one request handling pipe;

store, at the additional first-level token store of the selected one request handling pipe, a value indicating the selected one request buffer of the selected one request handling pipe in which the additional request is stored; and store, at the additional second-level token store, a value indicating the selected one request handling pipe in which the additional request is stored; and wherein the request selection circuit is further configured to:

send the additional requests from the different processor to the different devices according to the second temporal order, using values at additional first-level token stores of the request handling pipes and values at the additional second token store.

8. A method, comprising:

receiving, at a cache, requests from a processor for accessing different devices, wherein at least some of the requests are required to be sent to the different devices according to a temporal order, wherein the cache includes two or more request handling pipes respectively comprising (a) two or more request buffers configured to store the requests from the processor for accessing the different devices and (b) a first-level token store;

for an individual one of the at least some requests from the processor, selecting, using bank selection circuit of the cache, one request handling pipe and one request buffer to store the individual request, wherein the one request handling pipe is selected out of the two or more request handling pipes based on an address indicated by the individual request, and wherein the one request buffer is selected out of the two or more request buffers of the selected one request handling pipe based on available entries inside the two or more request buffers of the selected one request handling pipe;

storing, at the first-level token store of the selected one request handling pipe, a value indicating the selected one request buffer of the selected one request handling pipe in which the individual request is stored; and storing, at the second-level token store, a value indicating the selected one request handling pipe in which the individual request is stored; and sending, using request selection circuit of the cache, the at least some requests to the different devices according to the temporal order, based on values at first-level token stores of the request handling pipes and values at the second token store.

9. The method of claim 8, wherein sending the at least some requests to the different devices according to the temporal order comprises:

identifying a request handling pipe out of the two or more request handling pipes that stores an oldest request out of the at least some requests stored at the two or more request handling pipes, based on the values at the second-level token store;

for respective ones of the two or more request handling pipes, identifying a request buffer out of the two or more request buffers of the respective ones of the request handling pipes that stores an oldest request out of a subset of the at least some requests stored at the two or more request buffers of the respective ones of the request handling pipes, based on the values at the first-level token stores of the respective ones of the request handling pipes; and sending the oldest request stored at the identified request buffer of the identified request handling pipe to one of the devices.

10. The method of claim 8, wherein sending the at least some requests to the different devices according to the temporal order comprises:

identifying a request handling pipe out of the two or more request handling pipes that stores multiple requests consecutively that are older than remaining ones of the at least some requests stored at the two or more request handling pipes, based on the values at the second-level token store;

for the identified request handling pipe, identifying a request buffer out of the two or more request buffers of the identified request handling pipe that stores multiple requests consecutively within the identified request buffer that are older than remaining ones of a subset of the at least some requests stored at the two or more request buffers of the identified request handling pipe, based on the values at the first-level token stores of the identified request handling pipe; and sending together the multiple requests stored consecutively at the identified request buffer of the identified request handling pipe to one of the devices.

11. The method of claim 8, wherein at least some additional ones of the requests from the processor are not required to be sent to the different requests according to the temporal order, wherein the two or more request handling pipes respectively further comprise an additional first-level token store, wherein the cache further comprises an additional request selection circuitry, wherein the method further comprises:

for an individual one of the at least some additional requests from the processor, selecting, using the bank selection unit, one request handling pipe and one request buffer to store the additional request, wherein the one request handling pipe is selected out of the two or more request handling pipes based on an address indicated by the additional request, and wherein the one request buffer is selected out of the two or more request buffers of the selected one request handling pipe based on available entries inside the two or more request buffers of the selected one request handling pipe; and storing, at the additional first-level token store of the selected one request handling pipe, a value indicating the selected one request buffer of the selected one request handling pipe in which the additional request is stored, and sending, using the additional request selection circuitry, the at least some additional requests to the different devices, based on values at additional first-level token stores of the two or more request handling pipes.

12. The method of claim 11, wherein sending the at least some additional requests to the different devices further comprises:

for respective ones of the two or more request handling pipes, identifying a request buffer out of the two or more request buffers of the respective ones of the request handling pipes, based on the values at the additional first-level token stores of the respective ones of the request handling pipes, wherein the identified request buffer stores an oldest request out of a subset of the at least some additional requests stored at the two or more request buffers of the respective ones of the request handling pipes; and sending one of two or more oldest requests stored respectively at the identified request buffers of the respective ones of the two or more request handling pipes to one of the devices, without based on the values at the second-level token store.

13. The method of claim 8, wherein the two or more request handling pipes respectively further comprise an additional first-level token store, wherein the cache further comprises an additional second-level token store, and wherein the method further comprises:

receiving, at the cache, additional requests from a different processor that are required to be sent to the different devices according to a second temporal order;

for an individual one of at least some of the additional requests from the different processor, selecting one request handling pipe and one request buffer to store the additional request, wherein the one request handling pipe is selected out of the two or more request handling pipes based on an address indicated by the additional request, and wherein the one request buffer is selected out of the two or more request buffers of the selected one request handling pipe based on available entries inside the two or more request buffers of the selected one request handling pipe;

storing, at the additional first-level token store of the selected one request handling pipe, a value indicating the selected one request buffer of the selected one request handling pipe in which the additional request is stored; and storing, at the additional second-level token store, a value indicating the selected one request handling pipe in which the individual request is stored; and sending the additional requests from the different processor to the different devices according to the second temporal order, based on values at additional first-level token stores of the request handling pipes and values at the additional second token store.

14. The method of claim 8, further comprising:

receiving, at the cache, an additional request from the processor for accessing data stored at an address within the cache; and accessing the data stored at the address within the cache that is indicated by the additional request.

15. A system, comprising:

one or more processors; and a cache configured to be shared by the one or more processors, comprising:

two or more request handling pipes respectively comprising (a) two or more request buffers configured to store requests from one of the processors for accessing different devices, wherein at least some of the requests are required to be sent to the different devices according to a temporal order, and (b) a first-level token store;

a second-level token store;

a bank selection circuit configured to:

for an individual one of the at least some requests from the one processor, select one request handling pipe and one request buffer to store the individual request, wherein the one request handling pipe is selected out of the two or more request handling pipes based on an address indicated by the individual request, and wherein the one request buffer is selected out of the two or more request buffers of the selected one request handling pipe based on available entries inside the two or more request buffers of the selected one request handling pipe;

store, at the first-level token store of the selected one request handling pipe, a value indicating the selected one request buffer of the selected one request handling pipe in which the individual request is stored; and store, at the second-level token store, a value indicating the selected one request handling pipe in which the individual request is stored; and a request selection circuit configured to send the at least some requests to the different devices according to the temporal order, using values at first-level token stores of the request handling pipes and values at the second token store.

16. The system of claim 15, wherein to send the at least some requests to the different devices according to the temporal order, the request selection circuit of the cache is configured to:

identify a request handling pipe out of the two or more request handling pipes that stores an oldest request out of the at least some requests stored at the two or more request handling pipes, using the values at the second-level token store;

for respective ones of the two or more request handling pipes, identify a request buffer out of the two or more request buffers of the respective ones of the request handling pipes that stores an oldest request out of a subset of the at least some requests stored at the two or more request buffers of the respective ones of the request handling pipes, using the values at the first-level token stores of the respective ones of the request handling pipes; and send the oldest request stored at the identified request buffer of the identified request handling pipe to one of the devices.

17. The system of claim 15, wherein at least some additional ones of the requests from the one processor are not required to be sent to the different devices according to the temporal order, wherein the two or more request handling pipes of the cache respectively further comprise an additional first-level token store, wherein the bank selection unit is further configured to:

for an individual one of the at least some additional requests from the one processor, select one request handling pipe and one request buffer to store the additional request, wherein the one request handling pipe is selected out of the two or more request handling pipes based on an address indicated by the additional request, and wherein the one request buffer is selected out of the two or more request buffers of the selected one request handling pipe based on available entries inside the two or more request buffers of the selected one request handling pipe; and store, at the additional first-level token store of the selected one request handling pipe, a value indicating the selected one request buffer of the selected one request handling pipe in which the additional request is stored, and wherein the cache further comprises an additional request selection circuit configured to:

send the at least some additional requests to the different devices, using values at additional first-level token stores of the two or more request handling pipes.

18. The system of claim 17, wherein to send the at least some additional requests to the different devices, the additional request selection circuit of the cache is configured to:

for respective ones of the two or more request handling pipes, identify a request buffer out of the two or more request buffers of the respective ones of the request handling pipes, using the values at the additional first-level token stores of the respective ones of the request handling pipes, wherein the identified request buffer stores an oldest request out of a subset of the at least some additional requests stored at the two or more request buffers of the respective ones of the request handling pipes; and send one of two or more oldest requests stored respectively at the identified request buffers of the respective ones of the two or more request handling pipes to one of the devices, without using the values at the second-level token store.

19. The system of claim 15, wherein the first-level token stores are implemented using first-in first-out (FIFO) registers, and wherein the second-level token store is implemented using an additional first-in first-out (FIFO) register.

20. The system of claim 15, wherein the request buffers of the two or more request handling pipes are further configured to store additional requests from a different one of the processors that are required to be sent to the different devices according to a second temporal order, wherein the two or more request handling pipes respectively further comprise an additional first-level token store, and wherein the cache further comprises:

an additional second-level token store; and an additional bank selection circuit configured to:

for an individual one of the additional requests from the different processor, select one request handling pipe and one request buffer to store the additional request, wherein the one request handling pipe is selected out of the two or more request handling pipes based on an address indicated by the additional request, and wherein the one request buffer is selected out of the two or more request buffers of the selected one request handling pipe based on available entries inside the two or more request buffers of the selected one request handling pipe;

store, at the additional first-level token store of the selected one request handling pipe, a value indicating the selected one request buffer of the selected one request handling pipe in which the additional request is stored; and store, at the additional second-level token store, a value indicating the selected one request handling pipe in which the additional request is stored; and additional request selection circuit configured to:

send the additional requests from the different processor to the different devices according to the second temporal order, using values at additional first-level token stores of the request handling pipes and values at the additional second token store.

* * * * *